United States Patent
Takao et al.

(10) Patent No.: US 9,454,249 B2
(45) Date of Patent: Sep. 27, 2016

(54) TOUCHSCREEN SENSOR

(71) Applicant: NITTO DENKO CORPORATION, Ibaraki-shi, Osaka (JP)

(72) Inventors: Hiroyuki Takao, Ibaraki (JP); Toru Umemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 117 days.

(21) Appl. No.: 14/508,334

(22) Filed: Oct. 7, 2014

(65) Prior Publication Data

US 2015/0022743 A1    Jan. 22, 2015

Related U.S. Application Data

(63) Continuation of application No. PCT/JP2014/060369, filed on Apr. 10, 2014.

(30) Foreign Application Priority Data

May 27, 2013  (JP) ................................. 2013-111287

(51) Int. Cl.
G06F 3/041      (2006.01)
G06F 3/044      (2006.01)
G02B 1/11       (2015.01)

(52) U.S. Cl.
CPC ................. *G06F 3/041* (2013.01); *G02B 1/11* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 6,586,101 | B2* | 7/2003 | Chu | G02B 1/116 359/586 |
| 8,742,772 | B2* | 6/2014 | Takao | G06F 3/044 324/658 |
| 9,098,152 | B2* | 8/2015 | Guard | G06F 3/044 |
| 2008/0138589 | A1* | 6/2008 | Wakabayashi | G06F 3/044 428/195.1 |
| 2008/0152879 | A1* | 6/2008 | Nashiki | C23C 14/08 428/212 |
| 2011/0147340 | A1* | 6/2011 | Nashiki | G06F 3/044 216/13 |
| 2012/0114919 | A1 | 5/2012 | Nakajima et al. | |

(Continued)

FOREIGN PATENT DOCUMENTS

| | | |
|---|---|---|
| CN | 102543267 A | 7/2012 |
| CN | 102652340 A | 8/2012 |

(Continued)

OTHER PUBLICATIONS

Korean Office Action dated Dec. 2, 2015, issued in counterpart Korean Patent Application No. 10-2014-7022548, with English translation. (7 pages).

(Continued)

*Primary Examiner* — Antonio Xavier
(74) *Attorney, Agent, or Firm* — Westerman, Hattori, Daniels & Adrian, LLP

(57) ABSTRACT

A touchscreen sensor includes a transparent base material, a first index-matching layer, a first transparent electrode pattern, a second index-matching layer and a first adhesive layer disposed in this order at one side of the transparent base material, and a third index-matching layer, a second transparent electrode pattern, a fourth index-matching layer and a second adhesive layer disposed in this order at another side of the transparent base material. Each of the first, second, third and fourth index-matching layers has a refractive index of 1.6 to 1.8 and a thickness of 50 nm to 150 nm.

5 Claims, 1 Drawing Sheet

(56) References Cited

U.S. PATENT DOCUMENTS

| | | |
|---|---|---|
| 2012/0241199 A1 | 9/2012 | Kobayashi et al. |
| 2013/0087374 A1 | 4/2013 | Nah |
| 2013/0194211 A1 | 8/2013 | Shinohara et al. |
| 2013/0194220 A1* | 8/2013 | Lee .................. G06F 3/041 345/173 |
| 2013/0258570 A1 | 10/2013 | Nashiki et al. |
| 2015/0022222 A1* | 1/2015 | Takao ............... G06F 3/041 324/658 |
| 2015/0107665 A1* | 4/2015 | Raymond .......... H01L 31/0547 136/256 |
| 2015/0309353 A1* | 10/2015 | Stensvad ............ B32B 17/06 156/314 |
| 2015/0355518 A1* | 12/2015 | McCabe ............ B60R 1/088 359/275 |
| 2016/0048242 A1* | 2/2016 | Ahn .................. G06F 3/044 345/174 |

FOREIGN PATENT DOCUMENTS

| | | |
|---|---|---|
| CN | 103052931 A | 4/2013 |
| JP | 2009-73090 A | 4/2009 |
| JP | 2011-194679 A | 10/2011 |
| JP | 2011-253546 A | 12/2011 |
| JP | 2012-66477 A | 4/2012 |
| JP | 2012-203701 A | 10/2012 |
| JP | 2013-008099 A | 1/2013 |
| JP | 2013-8099 A | 1/2013 |
| KR | 10-2011-0061685 A | 6/2011 |
| KR | 10-2012-0012329 A | 2/2012 |
| KR | 10-2012-0047828 A | 5/2012 |
| KR | 10-2012-0109267 A | 10/2012 |
| TW | 201238763 A1 | 10/2012 |
| TW | 201243443 A1 | 11/2012 |
| TW | 201307881 A1 | 2/2013 |
| TW | 201314246 A1 | 4/2013 |
| WO | 2012/073990 A1 | 6/2012 |

OTHER PUBLICATIONS

Approval Decision Letter from the Intellectual Property Office dated Nov. 27, 2015, issued in counterpart Taiwanese Application No. 103118311, with English translation. ( 5 pages).
International Preliminary Report on Patentability (Form PCT/IB/373) issued in counterpart International Application No. PCT/JP2014/060369 dated Apr. 10, 2014, with PCT/ISA/237. (4 pages).
Written Opinion dated Oct. 6, 2014, issued in counterpart Application No. PCT/JP2014/060369, with English translation. (7 pages).
International Search Report dated Jun. 10, 2014 issued in corresponding application No. PCT/JP2014/060369.
Writtern Opinion of the International Searching Authority dated Jun. 10, 2014 issued in corresponding application No. PCT/JP2014/060369.
Office Action dated Jul. 14, 2015, issued in counterpart Taiwan Application No. 103118311, with English translation. (10 pages).
Office Action dated Apr. 13, 2016, issued in counterpart Korean application No. 10-2014-7022548, with English translation. (8pages).
Decision to Grant dated Jun. 6, 2016 in counterpart Japanese Application No. 2013-111287, with English translation. (5pages).
Office Action dated Jun. 21, 2016, in counterpart Chinese application No. 201480001163.X with English translation (pages).

* cited by examiner

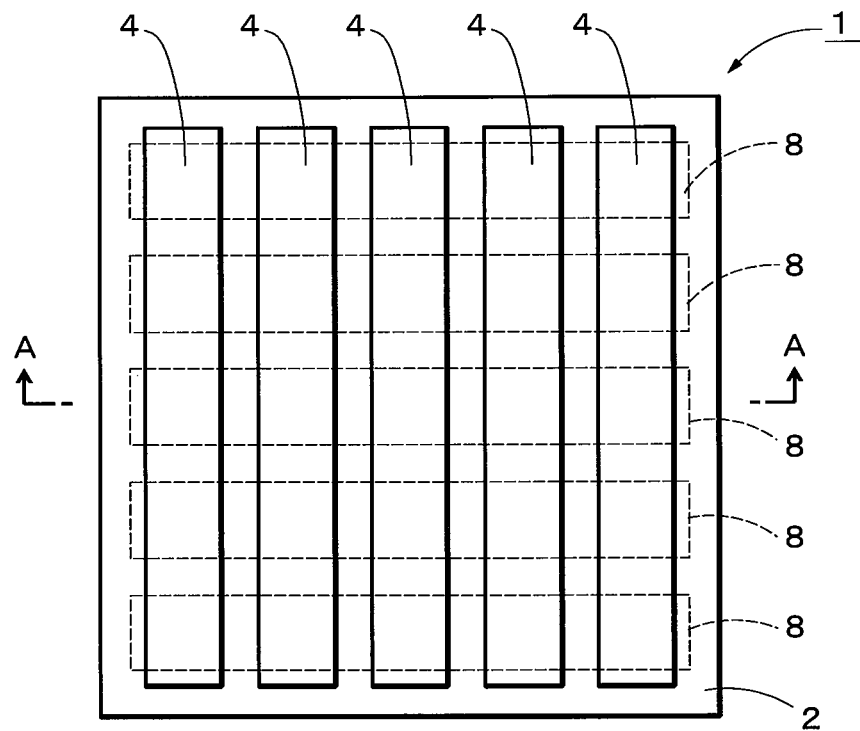
F I G. 1A
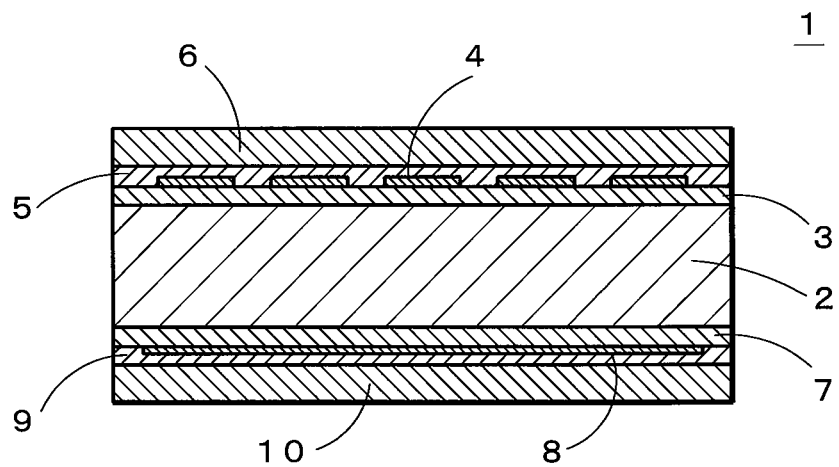
F I G. 1B

TOUCHSCREEN SENSOR

CROSS REFERENCE TO RELATED APPLICATIONS

This is a continuation application of International Patent Application No. PCT/JP2014/060369 filed Apr. 10, 2014, which claims the benefit of Japanese Patent Application No. 2013-111287, filed May 27, 2013, the full contents of all of which are hereby incorporated by reference in their entirety.

BACKGROUND

1. Technical Field

The present disclosure relates to a touchscreen sensor applicable to an input display device that is capable of inputting information by a touch with a finger, a stylus pen and the like.

2. Background Art

In the related art, laminated film having a transparent conductor layer at both sides of a transparent base material is known (Japanese Laid-Open Patent Publication No. 2012-066477). Such a laminated film enables accurate patterning of each of the transparent conductor layers and thus has a high relative positional accuracy of transparent electrode patterns.

However, with a configuration as described above in which transparent electrode patterns are formed at both sides of the transparent base material, when a touchscreen sensor is fabricated by directly laminating an adhesive layer on each of the transparent electrode patterns, there is a problem that interference fringes may be produced when light from outside is incident thereon.

The present disclosure is directed to providing a touchscreen sensor that can suppress occurrence of the interference fringes.

SUMMARY

According to an aspect of the present disclosure, a touchscreen sensor includes a transparent base material, a first index-matching layer, a first transparent electrode pattern, a second index-matching layer and a first adhesive layer disposed in this order at one side of the transparent base material, and a third index-matching layer, a second transparent electrode pattern, a fourth index-matching layer and a second adhesive layer disposed in this order at another side of the transparent base material, each of the first, second, third and fourth index-matching layers having a refractive index of 1.6 to 1.8 and a thickness of 50 nm to 150 nm.

Preferably, the refractive indices of the first and third index-matching layers are greater than the refractive index of the transparent base material and smaller than the refractive indices of the first and second transparent electrode patterns.

Preferably, the refractive indices of the second and fourth index-matching layers are greater than the refractive index of the first and second adhesive layers and smaller than the refractive indices of the first and second transparent electrode patterns.

Preferably, each of the refractive indices of the first, second, third and fourth index-matching layers is 1.6 to 1.7.

Preferably, each of the thicknesses of the first, second, third and fourth index-matching layers is 85 nm to 120 nm.

According to the present disclosure, first and third index-matching layers are disposed between a transparent base material and a transparent electrode pattern, and, further, second and fourth index-matching layers are disposed between a transparent electrode pattern and an adhesive layer. Further, each of the index-matching layers has a refractive index of 1.6 to 1.8 and a thickness of 50 nm to 150 nm. Accordingly, a touchscreen sensor that can suppress occurrence of interference fringes can be provided.

BRIEF DESCRIPTION OF DRAWINGS

FIG. 1A is a plan view schematically showing a configuration of a touchscreen sensor according to an embodiment of the present disclosure, and, FIG. 1B is a cross sectional view taken along line A-A in FIG. 1A.

DETAILED DESCRIPTION

Further features of the present disclosure will become apparent from the following detailed description of exemplary embodiments with reference to the accompanying drawings.

FIG. 1A is a plan view schematically showing a configuration of a touchscreen sensor according to an embodiment of the present disclosure, and, FIG. 1B is a cross sectional view taken along line A-A in FIG. 1A. Note that a length, a width or a thickness of each element in FIGS. 1A and 1B are shown by way of example, and a length, a width or a thickness of each element of the touchscreen sensor of the present disclosure are not limited to those shown in FIGS. 1A and 1B.

As shown in FIGS. 1A and 1B, a touchscreen sensor 1 of the present disclosure has a transparent base material 2, and an index-matching layer 3 (first index-matching layer), a transparent electrode pattern 4 (first transparent electrode pattern), an index-matching layer 5 (second index-matching layer) and an adhesive layer 6 (first adhesive layer) disposed in this order on one side of the transparent base material. Further, the touchscreen sensor 1 has an index-matching layer 7 (third index-matching layer), a transparent electrode pattern 8 (second transparent electrode pattern), an index-matching layer 9 (fourth index-matching layer) and an adhesive layer 10 (second adhesive layer) disposed in this order on another side of the transparent base material 2.

Each of the index-matching layer 3, the index-matching layer 5, the index-matching layer 7 and the index-matching layer 9 has a refractive index (relative refractive index) of 1.6 to 1.8 and a thickness of 50 nm to 150 nm.

In the touchscreen sensor 1 configured as described above, the index-matching layer 3 having a specific property is disposed between the transparent base material 2 and the transparent electrode pattern 4, and the index-matching layer 5 having a specific property is disposed between the transparent electrode pattern 4 and the adhesive layer 6. Further, the index-matching layer 7 having a specific property is disposed between the transparent base material 2 and the transparent electrode pattern 8, and the index-matching layer 9 having a specific property is disposed between the transparent electrode pattern 8 and the adhesive layer 10. By disposing in such a manner, a refractive index difference at an interface of laminated layers can be decreased. Thus, reflection of light from outside is weakened, and occurrence of interference fringes can be suppressed effectively.

In a touchscreen sensor of the related art, a transparent electrode pattern is directly laminated on a transparent base material and an adhesive layer is directly laminated on a transparent electrode pattern. In such a touchscreen sensor, interference fringes occur due an interference phenomenon between reflected light that is reflected on a top surface of the transparent electrode pattern laminated at a front side (viewing side) of the transparent base material (an interface between the adhesive layer and the transparent electrode pattern) and reflected light that is reflected on a top surface of the transparent electrode pattern laminated at a reverse side (a side opposite to the viewing side) of the transparent base material (an interface between the transparent base material and the transparent electrode pattern). Accordingly, in the present disclosure, reflected light produced on the front side of the transparent base material is particularly taken into account, and the index-matching layer 5 is disposed between the transparent electrode pattern 4 and the adhesive layer 6 on the front side of the transparent base material 2. Thereby, the reflected light reflecting on the top surface of the transparent electrode pattern 4 can be weakened. Further, in the present disclosure, reflected light produced on the back side of the transparent base material is particularly taken into account, and the index-matching layer 7 is disposed between the transparent base material 2 and the transparent electrode pattern 8 on the back side of the transparent base material 2. Thereby, the reflected light reflecting on the top surface of the transparent electrode pattern 8 can be weakened. Further, it is preferable to fabricate the touchscreen sensor in such a manner that a cross sectional structure thereof is front-and-back symmetrical, since there may also be a case where the touchscreen sensor is used with front and back being reversed. Accordingly, the index-matching layer 3 is disposed between the transparent base material 2 and the transparent electrode pattern 4 and the index-matching layer 9 is disposed between the transparent electrode pattern 8 and the adhesive layer 10. With this configuration, by weakening the reflected light reflecting on the top surface of the transparent electrode pattern 4 and the reflected light reflecting on the top surface of the transparent electrode pattern 8, interference between the two can be suppressed.

Note that, unless otherwise specified, refractive indices in the present specification represent values measured with respect to air using sodium D lines (wavelength 589.3 nm) at 25° C.

The touchscreen sensor 1 of the present disclosure includes the index-matching layer 3 and the index-matching layer 7 formed on the transparent base material 2, but it is not limited thereto. An easy adhesive layer (anchor coat layer) for increasing an adhesive strength, or a hard coat layer for increasing a surface hardness of the transparent base material 2 may be provided between the transparent base material 2 and the index-matching layer 3 or between the transparent base material 2 and the index-matching layer 7.

Details of each component of the touchscreen sensor 1 will now be described below.

(1) Transparent Base Material

The transparent base material in the present disclosure supports each of the first and second transparent electrode patterns. The transparent base material has a thickness of, for example, 20 μm to 200 μm.

The transparent base material is preferably a polymer film having a refractive index of greater than 1.45 and less than 1.60, but it is not particularly limited thereto. Further, the transparent base material is preferably a polycarbonate film (refractive index 1.59) or a polycycloolefin film (refractive index 1.53). Particularly, since a polycycloolefin film has permittivity lower than those of other materials, touch sensitivity can be increased in a case where the touchscreen sensor of the present disclosure is used in a capacitive sensing type touchscreen.

(2) Transparent Electrode Pattern

The first and second transparent electrode patterns in the present disclosure serve as a sensor for detecting a touch position. In general, the first and second transparent electrode patterns are electrically connected to a wiring (not shown) formed at an end portion of the transparent base material, and the wiring is connected to a controller IC (not shown).

The first and second transparent electrode patterns are formed into a lattice form in a plan view with one of them as an electrode for X-coordinates and the other as an electrode for Y-coordinates (FIG. 1A). Each transparent electrode pattern is, for example, stripe shaped and diamond shaped, but not particularly limited thereto.

The first and second transparent electrode patterns are typically made of a transparent conductor. The transparent conductor is a material that has a high transmittance in a visible light range (preferably greater than or equal to 80%), and a surface resistance value per unit area ($\Omega/\square$: ohms per square) of less than or equal to $500\Omega/\square$.

Normally, each of the first and second transparent electrode patterns has a refractive index of 1.9 to 2.5, which is the highest among members constituting the touchscreen sensor. A material forming the transparent conductor is, for example, an indium tin oxide (refractive index 2.0) or an indium zinc oxide (refractive index 2.3).

Each of the first and the second transparent electrode patterns has a height of preferably 10 nm to 100 nm, a width of preferably 0.1 mm to 5 mm, and a pitch of preferably 0.5 mm to 10 mm.

A method of forming the first and second transparent electrode patterns may be a method including forming a transparent conductor layer over an entire surface of the transparent base material by a sputtering method or a vacuum evaporation method, and thereafter patterning the transparent conductor layer by an etching treatment.

(3) Index-Matching Layer

The index-matching layers in the present disclosure are transparent layers each having a refractive index that is adjusted to a particular value to suppress reflection on the transparent electrode patterns. The first index-matching layer is formed between the transparent base material and the first transparent electrode pattern, and the second index-matching layer is formed at one side of the transparent base material to cover the first transparent electrode pattern. The third index-matching layer is formed between the transparent base material and the second transparent electrode pattern, and the fourth index-matching layer is formed at the other side of the transparent base material to cover the second transparent electrode pattern.

The first, second, third and fourth index-matching layers are each formed of a material which is preferably a light cured inorganic-organic composite material composed of an organic component, which may be a photosensitive resin or a photosensitive monomer, scattered with inorganic particles, but it is not particularly limited thereto, as long as a refractive index and a thickness thereof is within a predetermined range specified in the present disclosure. The inorganic particles may be, for example, silica, alumina, zirconia, and titanium oxide. The inorganic-organic composite material can be used in wet coating, and, as compared to dry coating such as sputtering, the wet coating does not require considerable equipment investment such as vacuum devices and suitable for a larger area, and thus has an improved productivity. The inorganic-organic composite material may be a material of, for example, an OPSTAR Z series (manufactured by JSR Corporation).

The first, second, third and fourth index-matching layers each has a refractive index of 1.6 to 1.8. From the view point of further suppressing occurrence of the interference fringes, it is preferably 1.6 to 1.7. When using an inorganic-organic composite material as the index-matching layer, the refractive index of the index-matching layer can be increased or decreased as appropriate by changing the type and the content of the inorganic particles.

The first and third index-matching layers each has a refractive index of preferably greater than the refractive index of the transparent base material and smaller than the refractive index of each of the first and second transparent electrode patterns. The second and fourth index-matching layers each has a refractive index of preferably greater than the refractive index of each of the first and second adhesive layers and smaller than the refractive index of each of the first and second transparent electrode patterns.

Each of the first, second, third and fourth index-matching layers has a thickness of 50 nm to 150 nm. It is preferably 85 nm to 120 nm from the view point of further suppressing occurrence of the interference fringes. Each of the first, second, third and fourth index-matching layers may be constituted by a single layer or may be constituted by a plurality of layers. However, each of the layers is preferably a single layer from the view point of further suppressing occurrence of the interference fringes. Note that the material, the refractive index and the thickness of the first, second, third and fourth index-matching layers may be respectively the same or may be different from each other.

(4) Adhesive Layer

The first and second adhesive layers in the present disclosure are laminated on the surfaces of the second and fourth index-matching layers, respectively. Each of the first and the second adhesive layers has a thickness of preferably 10 μm to 100 μm. From the viewpoint of uniformity and transparency, the material forming the first and second adhesive layers is preferably an acrylic adhesive. Each of the first and second adhesive layers has a refractive index of preferably 1.4 to 1.6.

As mentioned above, according to the present embodiment, the first and third index-matching layers are disposed between the transparent base material and the respective transparent electrode patterns, and further, the second and fourth index-matching layers are disposed between the respective transparent electrode patterns and the respective adhesive layers. Further, the first, second, third and fourth index-matching layers each has a refractive index of 1.6 to 1.8 and a thickness of 50 nm to 150 nm. Thereby, reflection of light from outside is weakened, and occurrence of interference fringes can be suppressed effectively.

In the above description, a touchscreen sensor of the present embodiment has been described, but the present disclosure is not limited to the embodiment described above, and various alterations and modifications can be made based on a technical concept of the present disclosure.

Examples of the present disclosure will be described below.

EXAMPLES

Example 1

A hardcoat layer containing spherical particles of 3 μm in diameter was formed sequentially on both sides of a transparent base material made of a polycycloolefin film (manufactured by Nippon Zeon Corporation, product name ZEONOR) having a thickness of 100 μm. Thereafter, on each of the hardcoat layers, an inorganic-organic composite material (manufactured by JSR Corporation, product name OPSTAR KZ6661) in which inorganic particles are scattered in an organic component of a photosensitive monomer was applied and light cured to form the first and third index-matching layers each having a refractive index of 1.65 and a thickness of 100 nm.

Then, the transparent base material was placed in a sputtering device in which a sintered target containing indium oxide of 97% by weight and tin oxide of 3% by weight was installed, and an indium tin oxide layer having a thickness of 27 nm was formed at one side of the transparent base material by sputtering. Thereafter, a process similar to the above was performed at the other side of the transparent base material, and an indium tin oxide layer having a thickness of 27 nm was formed. Then, the transparent base material provided with the indium tin oxide layer at both sides was heat-treated at 150° C. for 90 minutes, and each of the indium tin oxide layer was converted from amorphous to crystalline.

Thereafter, the indium tin oxide layer formed at one side of the transparent base material was protected by laminating a protective layer of a polyester film (manufactured by Sun A. Kaken Co., Ltd.) thereon. On the indium tin oxide layer formed at the other side of the transparent base material, a photoresist was applied in a striped shape and thereafter immersed in hydrochloric acid to form a transparent electrode pattern. Subsequently, a similar process was performed on the indium tin oxide layer formed at the other side of the transparent base material, and the transparent electrode patterns were formed at both sides of the transparent base material.

Then, at one side of the transparent base material, an inorganic-organic composite material (manufactured by JSR Corporation, product name OPSTAR KZ6661) was applied so as to cover the transparent electrode pattern and light cured to form the second index-matching layer having a refractive index of 1.65 and a thickness of 100 nm. A similar process was performed on the other side of the transparent base material to form the fourth index-matching layer.

Then, on a surface of each of the second and fourth index-matching layers, an acrylic adhesive layer (manufactured by Nitto Denko Corporation, product name LUCI-ACS) having a refractive index of 1.5 was laminated to fabricate a touchscreen sensor.

Example 2

A touchscreen sensor was fabricated with a method similar to the method of Example 1, except that a thickness of each of the first, second, third and fourth index-matching layers was 85 nm, respectively.

Example 3

A touchscreen sensor was fabricated with a method similar to the method of Example 1, except that a thickness of each of the first, second, third and fourth index-matching layers was 120 nm, respectively.

Comparative Example 1

A touchscreen sensor was fabricated with a method similar to the method of Example 1, except that the first, second, third and fourth index-matching layers having a refractive index of 1.54 and 100 nm were formed by a thermosetting resin composed of a melamine resin, an alkyd resin and an organic silane condensation product.

Comparative Example 2

A touchscreen sensor was fabricated with a method similar to the method of Example 1, except that none of the first, second, third and fourth index-matching layers were provided.

Then, each of the touchscreen sensors of Examples 1 to 3 and Comparative Examples 1 and 2 fabricated as described above was placed on a smooth evaluation table and a glass plate (manufactured by Corning Incorporated, product name GORILLA) was disposed at a viewing side and a black tape for antireflection was attached at the back side to provide a mock touchscreen. The touch screen was illuminated with a three-wavelength fluorescent lamp from the viewing side and a degree of occurrence of the interference fringes was evaluated by visual observation. The results are shown in Table 1. In Table 1, "○" denotes a case in which almost no interference fringes were viewed and "X" denotes a case in which interference fringes were viewed clearly by visual inspection.

TABLE 1

| | FIRST TO FOURTH INDEX-MATCHING LAYERS | | EVALUATION OF INTERFERENCE FRINGES (VISUAL INSPECTION) |
|---|---|---|---|
| | REFRACTIVE INDEX OF EACH LAYER | THICKNESS OF EACH LAYER (nm) | |
| EXAMPLE 1 | 1.65 | 100 | ○ |
| EXAMPLE 2 | 1.65 | 85 | ○ |
| EXAMPLE 3 | 1.65 | 120 | ○ |
| COMPARATIVE EXAMPLE 1 | 1.54 | 100 | X |
| COMPARATIVE EXAMPLE 2 | — | — | X |

As shown in Example 1 of Table 1, when the refractive index of the first to fourth index-matching layers is 1.65, and the thickness is each 100 nm, almost no interference fringes were viewed in a touch screen. Also, in Example 2, when the refractive index of the first to fourth index-matching layers is 1.65, and the thickness is each 85 nm, almost no interference fringes were viewed in a touch screen. In Example 3, when the refractive index of the first to fourth index-matching layers is 1.65, and the thickness is each 120 nm, almost no interference fringes were viewed in a touch screen.

On the other hand, as shown in Comparative Example 1, when the refractive index of the first to fourth index-matching layers is 1.54, and the thickness is each 100 nm, interference fringes were clearly viewed in a touch screen. Also, in Comparative Example 2 in which none of the first to fourth index-matching layers were provided, interference fringes were clearly viewed in a touch screen.

Therefore, it was found that occurrence of interference fringes can be sufficiently suppressed when the refractive index of the first to fourth index-matching layers is 1.65 and the thickness is 85 nm to 120 nm.

INDUSTRIAL APPLICABILITY

The use of the touchscreen sensor of the present disclosure is not particularly limited, and it is preferably a capacitive sensing touch screen that is used in portable terminals such as smartphones or tablet terminals (Slate PCs).

What is claimed is:

1. A touchscreen sensor comprising:
   a transparent base material;
   a first index-matching layer, a first transparent electrode pattern, a second index-matching layer and a first adhesive layer disposed in this order at one side of the transparent base material; and
   a third index-matching layer, a second transparent electrode pattern, a fourth index-matching layer and a second adhesive layer disposed in this order at another side of the transparent base material,
   each of the first, second, third and fourth index-matching layers having a refractive index of 1.6 to 1.8 and a thickness of 50 nm to 150 nm.

2. The touchscreen sensor according to claim 1, wherein the refractive indices of the first and third index-matching layers are greater than the refractive index of the transparent base material and smaller than the refractive indices of the first and second transparent electrode patterns.

3. The touchscreen sensor according to claim 1, wherein the refractive indices of the second and fourth index-matching layers are greater than the refractive index of the first and second adhesive layers and smaller than the refractive indices of the first and second transparent electrode patterns.

4. The touchscreen sensor according to claim 1, wherein each of the refractive indices of the first, second, third and fourth index-matching layers is 1.6 to 1.7.

5. The touchscreen sensor according to claim 1, wherein each of the thicknesses of the first, second, third and fourth index-matching layers is 85 nm to 120 nm.

* * * * *